(12) United States Patent
Sujan et al.

(10) Patent No.: US 9,235,817 B2
(45) Date of Patent: Jan. 12, 2016

(54) SYSTEM AND METHOD OF DETERMINING FREIGHT/LOAD DISTRIBUTION FOR MULTIPLE VEHICLES

(75) Inventors: Vivek A. Sujan, Columbus, IN (US); Phani Vajapeyazula, Columbus, IN (US); Kenneth Follen, Greenwood, IN (US); An Wu, Columbus, IN (US); Barty L. Moffett, Seymour, IN (US)

(73) Assignee: CUMMINS INTELLECTUAL PROPERTY, INC., Minneapolis, MN (US)

( * ) Notice: Subject to any disclaimer, the term of this patent is extended or adjusted under 35 U.S.C. 154(b) by 1005 days.

(21) Appl. No.: 13/349,557

(22) Filed: Jan. 12, 2012

(65) Prior Publication Data

US 2012/0239588 A1 Sep. 20, 2012

Related U.S. Application Data

(60) Provisional application No. 61/432,022, filed on Jan. 12, 2011.

(51) Int. Cl.
| | |
|---|---|
| *G06Q 30/00* | (2012.01) |
| *G06Q 10/04* | (2012.01) |
| *G06Q 10/08* | (2012.01) |
| G06Q 10/00 | (2012.01) |
| F02D 41/14 | (2006.01) |

(52) U.S. Cl.
CPC ............ *G06Q 10/047* (2013.01); *G06Q 10/083* (2013.01); *F02D 41/1406* (2013.01); *F02D 2200/0625* (2013.01)

(58) Field of Classification Search
CPC ............ G06Q 10/08355; G06Q 10/08; G06Q 10/083; G06Q 50/28

USPC ......................................................... 705/338
See application file for complete search history.

(56) References Cited

U.S. PATENT DOCUMENTS

| | | | |
|---|---|---|---|
| 5,541,848 A * | 7/1996 | McCormack et al. ........ 700/213 |
| 5,983,156 A | 11/1999 | Andrews |
| 7,353,181 B2 | 4/2008 | Nel |
| 7,415,333 B2 | 8/2008 | Anderson |
| 2005/0216182 A1 | 9/2005 | Hussain et al. |
| 2007/0118502 A1 | 5/2007 | Aragones et al. |
| 2010/0010732 A1 | 1/2010 | Hartman |

(Continued)

OTHER PUBLICATIONS

Tamer F. Abdelmaguid et al.; "A genetic algorithm approach to the integrated inventory-distribution problem"; International Journal of Production Research, vol. 44, No. 21, pp. 4445-4464; Nov. 1, 2006.

(Continued)

*Primary Examiner* — George Chen
(74) *Attorney, Agent, or Firm* — Foley & Lardner LLP

(57) ABSTRACT

Systems and methods of vehicle freight/load distribution are provided to assist in determining optimal freight distribution. Although it is standard practice to fill each vehicle to its maximum limit, due to the non-linear nature of engine fueling maps (that is, fueling maps vary non-linearly as a function of torque and speed), the optimal distribution may not be obtained by the standard practice. Finding a solution for the optimal freight distribution may also need to account for the cost of fueling and operator costs, particularly if the situation involves multiple vehicles not filled to capacity. The benefit is increased freight efficiency in transporting cargo from source to destination amongst a fleet of vehicles.

18 Claims, 6 Drawing Sheets

(56) References Cited

U.S. PATENT DOCUMENTS

2010/0114437 A1  5/2010  Boss et al.
2010/0287073 A1  11/2010  Kocis et al.

OTHER PUBLICATIONS

The International Search Report and the Written Opinion of the International Searching Authority dated May 2, 2012; International Application No. PCT/US2012/021149.

* cited by examiner

SYSTEM AND METHOD OF DETERMINING FREIGHT/LOAD DISTRIBUTION FOR MULTIPLE VEHICLES

CROSS-REFERENCE TO RELATED APPLICATION

This application claims the benefit of U.S. Provisional Application No. 61/432,022, filed Jan. 12, 2011, which is hereby incorporated by reference in its entirety.

TECHNICAL FIELD

This disclosure relates freight distribution amongst multiple vehicles. More particularly, the present disclosure relates to the distribution of freight over multiple vehicles while minimizing the aggregate fuel consumption.

BACKGROUND

Vehicle operators generally prefer to load the maximum amount of freight that their vehicle can carry when undertaking a delivery. Many operators adopt this behavior because they are often paid based on the amount of freight delivered within a certain amount of time. Thus, most operators are motivated to traverse their routes as rapidly as possible with as much freight as they can legally carry.

As vehicles traverse a given route, fuel economy can be significantly influenced by the way an operator selects the vehicle speed. An aggressive operator that creates rapid transitions in speed while maintaining the maximum allowable speed limit through the route (legal, fleet owner imposed, etc.), will likely not achieve maximum fuel economy. Such a driver will prefer to maximize fuel load and freight quantity in order to accommodate their driving pattern.

SUMMARY

According to some embodiments of the present disclosure, a method is provided for determining freight distribution amongst multiple vehicles. The method includes accessing operator input data indicative of at least one operator input, the at least one operator input including at least one of route beginning and ending points to define a route, number of vehicles, maximum vehicle freight weight for each of a plurality of vehicles, and total freight weight. The method further includes accessing predetermined vehicle parameter data for each of the plurality of vehicles indicative of at least one predetermined vehicle parameter, the at least one predetermined vehicle parameter including at least one of vehicle mass, vehicle drag, vehicle rolling resistance, tire circumference, front area of vehicle, powertrain torque loss, vehicle tank capacity, and engine efficiency. The method additionally includes accessing road terrain data indicative of at least one road terrain element, the at least one road terrain element including at least one of speed limit changes, road grade, air density, position, elevation, and traffic patterns. The method also includes determining a first plurality of freight distribution solutions based on the maximum vehicle freight weight for each of the vehicles and the total freight weight, each solution comprising a random distribution of freight amongst the plurality of vehicles, the first plurality of freight distribution solutions comprising an initial generation, and evaluating each of the first plurality of freight distribution solutions of the initial generation for fitness based on fuel economy and ranking each solution based on the evaluation. The method additionally includes determining a second plurality of freight distribution solutions based on the maximum vehicle freight weight for each of the vehicles and the total freight weight, each solution comprising a distribution of freight amongst the plurality of vehicles according to a genetic algorithm, the second plurality of freight distribution solutions comprising a next generation, and evaluating each of the freight distribution solutions of the next generation for fitness based on fuel economy, ranking each solution based on the evaluation, and assessing solution convergence based on the ranking. And the method includes determining an optimal freight distribution based on the convergence assessment; and generating an electronic recommendation signal corresponding to the determined optimal freight distribution and communicating the recommendation signal to a receiver.

According to other embodiments of the present disclosure, a system adapted to determine freight distribution amongst multiple vehicles is provided. The system includes an operator input module containing data indicative of at least one operator input, the at least one operator input including at least one of fuel cost, trip time, route beginning and ending points to define a route, and maximum vehicle speed. The system further includes a vehicle parameter module containing data indicative of at least one predetermined vehicle parameter, the at least one predetermined vehicle parameter including at least one of vehicle mass, vehicle drag, vehicle rolling resistance, tire circumference, front area of vehicle, powertrain torque loss, vehicle tank capacity, and engine efficiency. The system also includes a road terrain element module containing data indicative of at least one road terrain element, the at least one road terrain element including at least one of speed limit changes, road grade, air density, position, elevation, and traffic patterns. And the system includes a vehicle load distribution module adapted to determine a first and second plurality of freight distribution solutions based on the maximum vehicle freight weight for each of the vehicles and the total freight weight, each solution from the first plurality comprising a random distribution of freight amongst the plurality of vehicles, the first plurality of freight distribution solutions comprising an initial generation, each solution from the second plurality comprising a distribution of freight amongst the plurality of vehicles according to a genetic algorithm, the second plurality of freight distribution solutions comprising a next generation; evaluate each of the first and second freight distribution solutions for fitness based on fuel economy and ranking each solution based on the evaluation, the fitness module being further adapted to assess solution convergence based on the ranking and determine an optimal freight distribution based on the convergence assessment; and generate an electronic recommendation signal corresponding to the determined optimal freight distribution and communicate the recommendation signal to a receiver.

Additional embodiments of the present disclosure provide a system and method for determining freight distribution amongst multiple vehicles to be implemented in computer programmable software and stored in computer readable media.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The above and/or other exemplary features and advantages of the preferred embodiments of the present disclosure will become more apparent through the detailed description of exemplary embodiments thereof with reference to the accompanying drawings, in which.

Throughout the drawings, like reference numbers and labels should be understood to refer to like elements, features, and structures.

DETAILED DESCRIPTION

Exemplary embodiments of the present disclosure will now be described more fully with reference to the accompanying drawings. The matters exemplified in this description are provided to assist in a comprehensive understanding of various embodiments disclosed with reference to the accompanying figures. Accordingly, those of ordinary skill in the art will recognize that various changes and modifications of the embodiments described herein can be made without departing from the scope and spirit of the claimed inventions. Descriptions of well-known functions and constructions are omitted for clarity and conciseness. To aid in clarity of description, the terms "upper," "lower," "above," "below," "left" and "right," as used herein, provide reference with respect to orientation of the accompanying drawings and are not intended to be limiting.

Given a quantity of vehicles, freight, and route, the present disclosure is directed to finding the most efficient distribution of freight amongst the vehicles. Although it is standard practice to fill each vehicle to its maximum limit, due to the non-linear nature of engine fueling maps (that is, fueling maps vary non-linearly as a function of torque and speed), the optimal distribution may not be obtained by the standard practice. Finding a solution for the optimal freight distribution may also need to account for the cost of fueling and operator costs, particularly if the situation involves multiple vehicles not filled to capacity. Accordingly, one benefit of the present disclosure is the increased freight efficiency in transporting cargo from source to destination.

Figure 1:
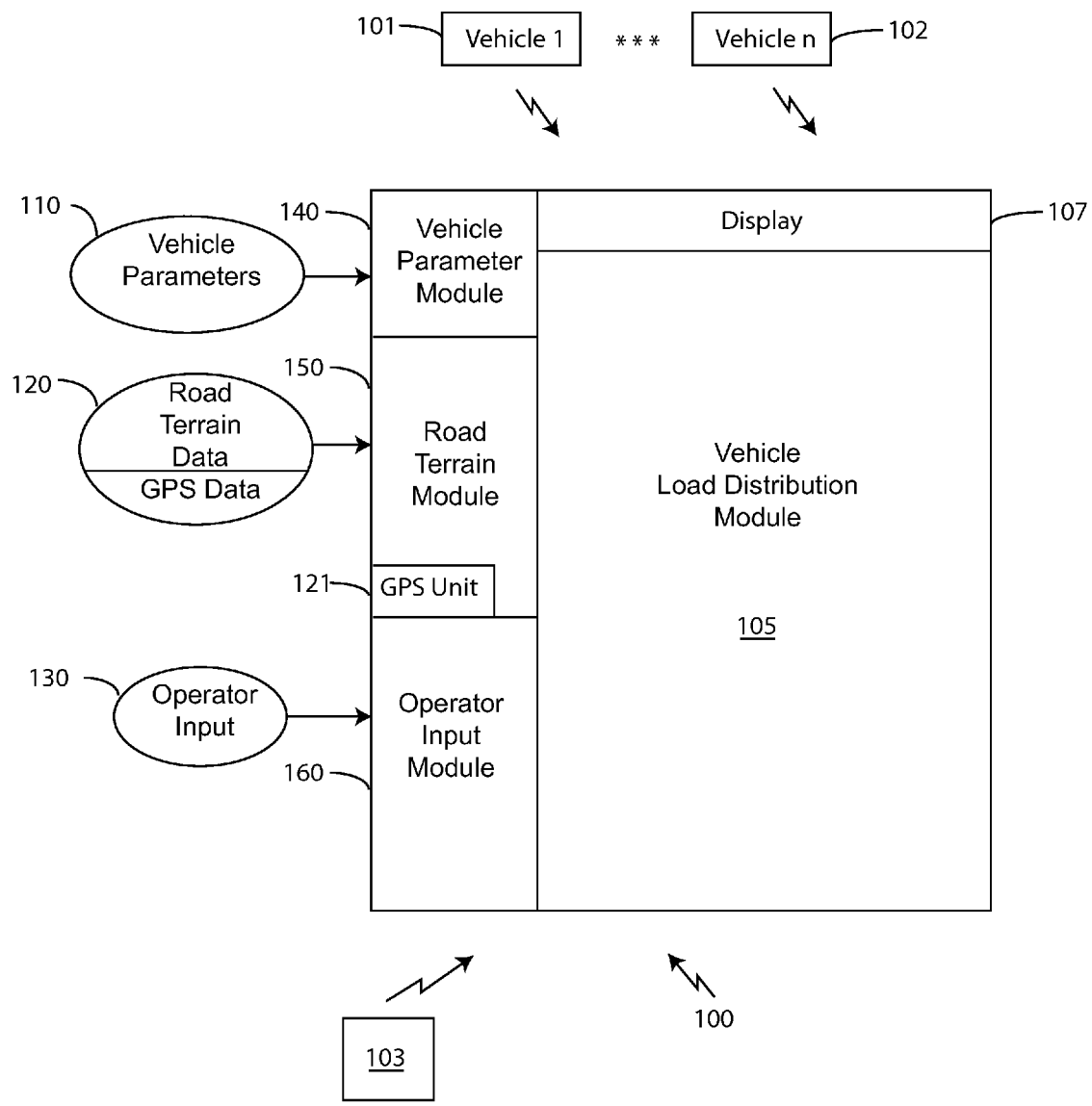
FIG. 1 is a system diagram for a vehicle load distribution system in accordance with an exemplary embodiment of the present disclosure.
Figure 2:
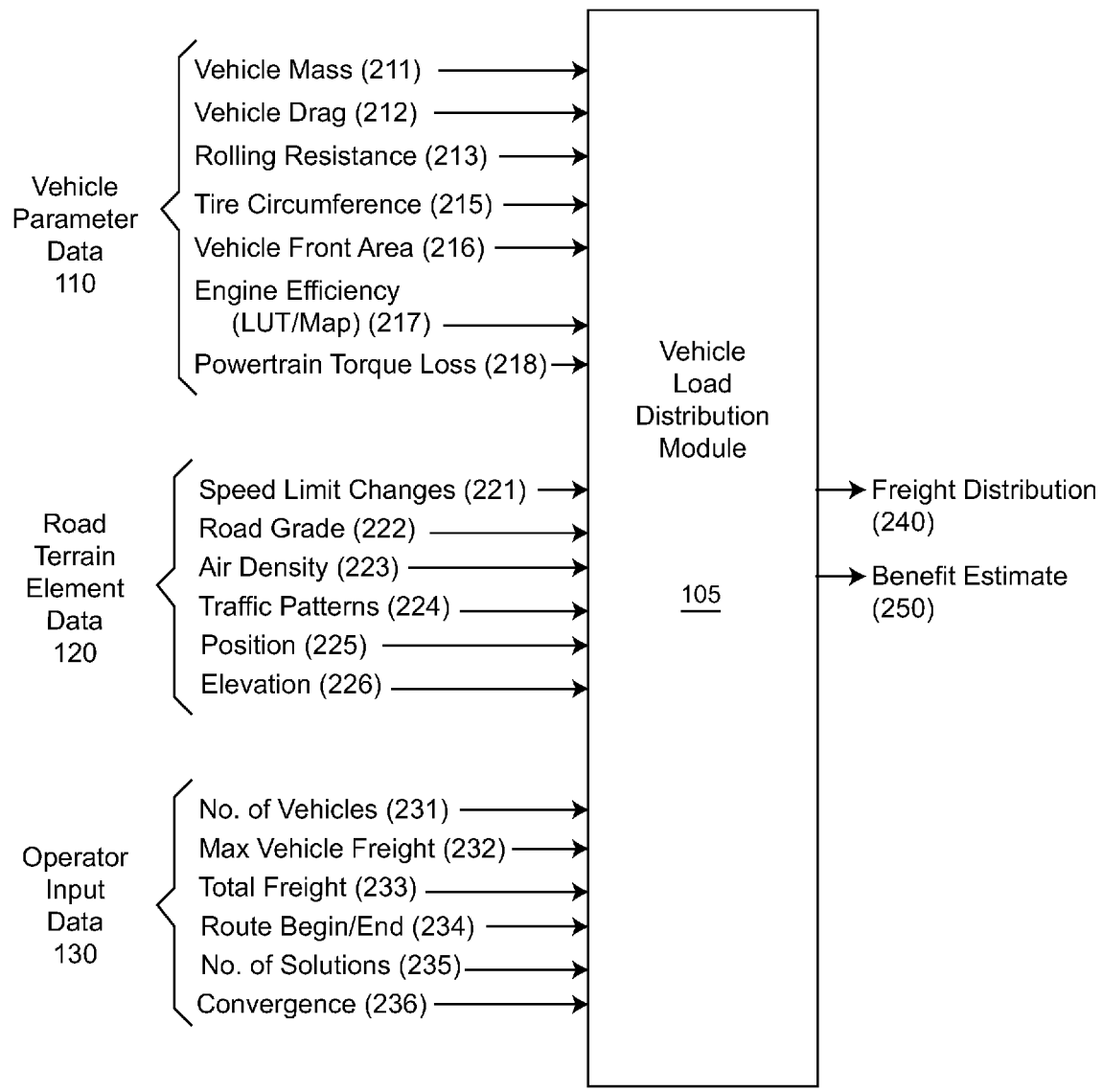
FIG. 2 is an input/output flow diagram for a vehicle load distribution module in accordance with an exemplary embodiment.

FIG. 1 is a system diagram for a vehicle load distribution system 100 in accordance with an exemplary embodiment of the systems and methods of the present disclosure. Generally, predetermined vehicle parameters 110, road terrain profile data/information 120, and operator input 130 are input into a vehicle load distribution module 105 directly or via a computer network, such as, for example, when maintained in computer storage 103. These inputs are used by a vehicle load distribution module 105 to determine a recommended freight distribution over a plurality of vehicles. In addition to other components, vehicle load distribution module 105 may also include a central processor and database, and communication equipment/modules to enable input data, such as road terrain data, to be transmitted to the central processor for monitoring and control. Vehicle load distribution module 105 may include a vehicle parameter module 140 adapted to receive vehicle parameters 110, a road terrain module 150 adapted to receive road terrain data 120, and an operator input module 160 to receive operator input 130. Exemplary embodiments provide for at least a portion of the road terrain data to be provided as GPS data to a GPS unit 121, which can supply data in advance of an operation relative to the route(s) traversed. Alternate embodiments provide for road terrain data to be maintained in computer storage 103 and downloaded to the vehicle load distribution module 105 over a network or transmitted wirelessly over-the-air at any time, for example, by using cellular technology. As shown in FIG. 2, using this module, the operator can, amongst other things, specify such preferences as the number of vehicles in which to distribute freight 231, maximum freight weight that each vehicle can carry 232, the total weight of freight that should be distributed 233, route beginning and ending points/locations 244, the number of solutions in the population 235, and a desired level of fitness convergence 236. Exemplary embodiments provide for the operator to specify preferences via display 107 that is adapted to, amongst other things, indicate the freight distribution and an estimate of benefit to an operator. Exemplary embodiments provide that one or more of modules 140, 150 and 160 may be separate from vehicle load distribution module 105.

FIG. 2 is an input/output flow diagram for a vehicle load distribution module 105 in accordance with an exemplary embodiment of the systems and methods of the present disclosure. FIG. 2 illustrates system inputs to vehicle load distribution module 105, which processes the inputs to determine, amongst other things, a recommended freight distribution 240 to optimize freight distribution amongst a plurality of vehicles. Data indicative of at least one vehicle parameter 110 is received as an input to vehicle load distribution module 105, for example, input to the vehicle parameter module 140. The vehicle parameter data 110 includes data signifying or representing, for example, vehicle mass 211, vehicle drag 212, vehicle rolling resistance 213, tire circumference 215, vehicle front area 216, engine efficiency 217, powertrain torque loss 218, and driveline ratio and/or axle loading (not shown), which in exemplary embodiments provide three values corresponding to loading on the steer tire, drive tire and trailer tires. The driveline ratio comprises a secondary gearing used in mechanically coupling the transmission to the wheels and is available in certain but not all vehicles. When a driveline ratio is available then the ratio is considered by the vehicle load distribution module 105 in determining fueling recommendations. Vehicle parameter data 110 may include actual values of each of these parameters, such as a vehicle mass value, a drag value, and/or a rolling resistance value. Data indicative of at least one road terrain element 120 is also received as an input to the vehicle load distribution module 105, for example, to the road terrain module 150. The road terrain element data 120 includes data signifying or representing speed limit changes 221, road grade 222, air density 223, traffic patterns or congestion 224, position 225 and elevation 226. Exemplary embodiments provide for speed limit and road terrain data to be furnished by an Advanced Driver Assistance System (ADAS), such as that furnished by data vendors, such as, for example, E-Horizon™ and NAVTEQ Traffic™ systems; positional-based systems, such as a GPS, can provide data on vehicle position 225, that is, vehicle position or location (geographical/GPS coordinates). Road terrain element data 120, such as route grade 222, elevation 226, speed limit changes 221 can be obtained ahead of time to provide a snapshot of the entire route. Data indicative of at least one operator input 130 is also received as an input to the vehicle load distribution module 105, for example, to the operator input module 160. The operator input data 130 includes data signifying or representing as the number of vehicles in which to distribute freight 231, maximum freight weight that each vehicle can carry 232, the total weight of freight that should be distributed 233, route beginning and ending points/locations 244, the number of solutions in the population 235, a desired level of fitness convergence 236, and maximum vehicle speed (not shown), which is a speed the operator prefers not to exceed and may be less than the legal speed limit. Vehicle load distribution module 105 processes the various parameters, data, and inputs, and generates outputs as described in more detail hereinbelow. Outputs from vehicle load distribution module 105 include freight distribution 240 and benefit estimate 250, which is the benefit realized from fuel economy improvement over a baseline uniform freight weight distribution. Exemplary embodiments provide for generating electronic recommendation signals corresponding to the optimal freight distribution and communicating the recommendation signal to a receiver, wherein a receiver can be a display, computer, server, or electronic device.

Figure 3:
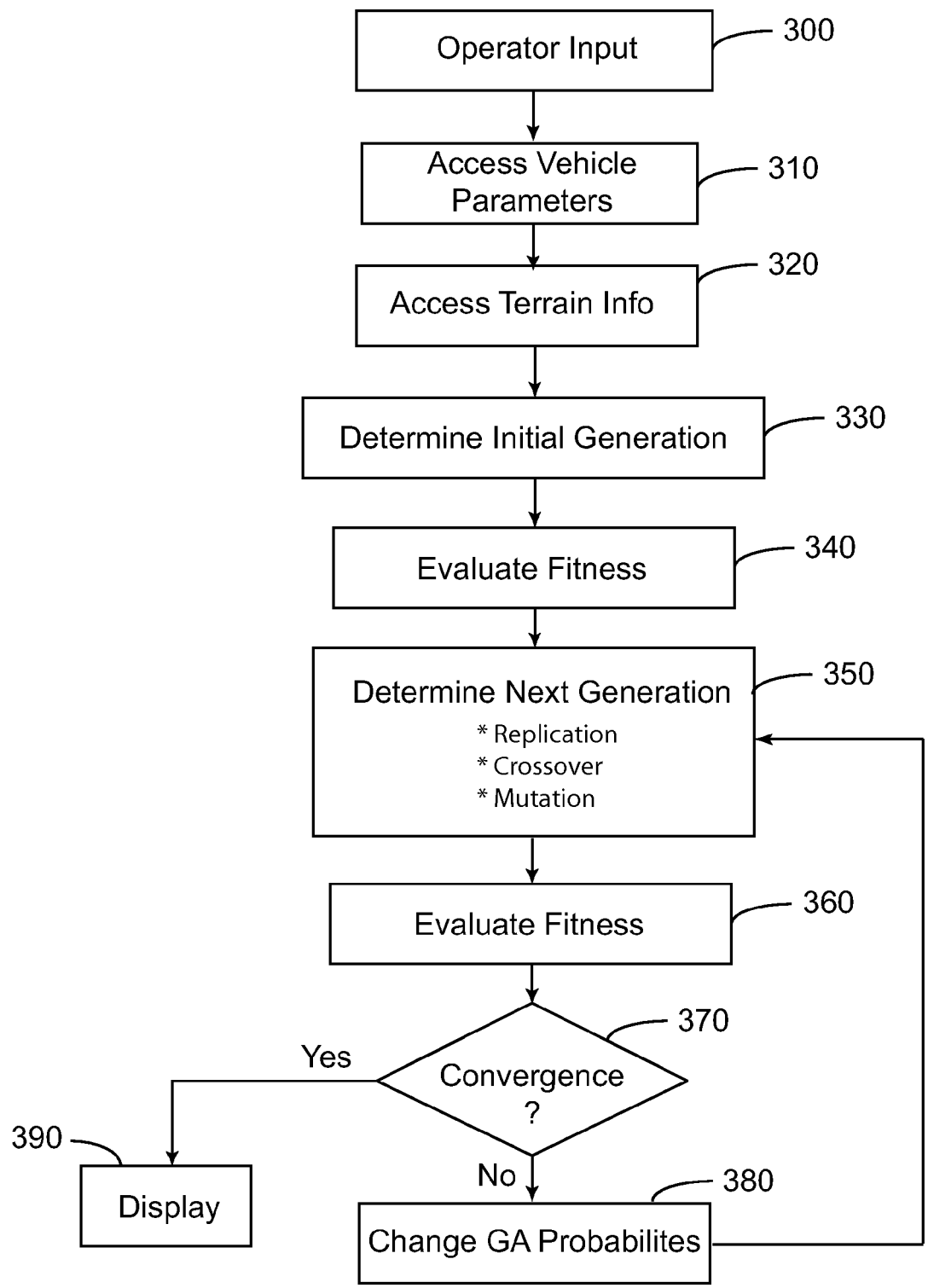
FIG. 3 is a flow diagram depicting method steps for determining vehicle load distribution in accordance with an exemplary embodiment.

FIG. 3 is a flow diagram depicting method steps for determining vehicle load distribution in accordance with an exemplary embodiment. The method includes two steps: first, determining a first plurality of freight distribution solutions based on maximum vehicle freight weight 232 for each vehicle and the total freight weight 233. Each solution in this first plurality is formed of a random distribution of freight amongst the plurality of vehicles. This first plurality of freight distribution solutions comprises an initial generation. Next, the method determines a second plurality of freight distribution solutions based on maximum vehicle freight weight 232 for each vehicle and the total freight weight 233. Each solution in this second plurality is formed of a distribution of freight amongst the plurality of vehicles according to a genetic algorithm. This second plurality of freight distribution solutions comprises a next generation, as described herein below. Each population of solutions is arrived at by performing a fuel assessment over the full drive cycle/route to provide a determination of fuel needs for the overall route based on initial data, conditions, inputs and parameters. As a preliminary matter, an operator provides operator input data 130 comprising at least one operator input such as the number of vehicles in which to distribute freight 231, maximum freight weight that each vehicle can carry 232, the total weight of freight that should be distributed 233, route beginning and ending points 244, the number of solutions in the population 235, and a desired level of fitness convergence 236, step 300. In determining the initial generation of solutions, module 105 performs an evaluation or initialization with known route and vehicle data by accessing predetermined vehicle parameter data, step 310, and road terrain element data, step 320, to determine route grade and speed profile vectors for the defined route. Inputs to the vehicle load distribution module 105 are received by an input processing module (not shown), which processes input data to a form useable by module 105. For example, the input possessing module can translate data to different units, filter noise, truncate vectors, etc. Similarly, outputs from the vehicle load distribution module 105 are received by an output processing module (not shown), which processes output data to a usable form.

The route grade and speed profile vectors comprise the spectrum of route grade and speed limits over the course of the route so that grade and speed limits are identified for the entire route. The vectors are determined by accessing data pertaining to road grade and speed limit over the entire route from the ADAS and/or GPS unit and populating data structures with grade and speed limit data for the entire route. With this data, anticipated power demand can be determined over the entire route, which can then be translated into anticipated fuel consumption using the engine fuel map, as described in more detail hereinbelow. Thus, the amount of fuel required to traverse the entire route is ascertained. In exemplary embodiments, one of many formulations of power, as would be known to those of ordinary skill in the art, can be expressed as a function of vehicle velocity (v), air density ($\rho$), vehicle drag ($C_d$), vehicle front area (A), rolling resistance ($C_{rr}$), vehicle mass (m), gravitational acceleration (g), and road grade ($\theta$), provided by Equation I:

$$\text{Power} = \left\{\frac{1}{2}\rho C_d A v^2 + C_{rr} m g \cos(\theta) + m g \sin(\theta)\right\} v \quad \text{Equation I}$$

Another formulation of power expressed as to a single vehicle (veh i) and velocity (u), also as would be known to those of ordinary skill in the art, can be expressed so as to incorporate vehicle weight (W), provided by Equation II:

$$P_{veh\,i} = \frac{C_d \rho u^2 A}{2} u + C_{rr} W_{normal} u + W \sin\theta_{grade} u + \frac{W}{g}\frac{du}{dt}u \quad \text{Equation II}$$

Power demanded by a vehicle is a function, primarily, of the vehicle operating condition, which, among other things, includes vehicle mass, vehicle speed, rolling resistance and transmission gear, coupled with the instantaneous road conditions (road grade, elevation, drag, wind speed, air density, etc.). For example, if either the speed or grade drops/decreases by traveling at a lower speed or going downhill, less power will be required for the vehicle to traverse a given distance. Accounting for system inefficiencies, power can be translated into engine torque and the vehicle's system of gears translates vehicle speed to engine speed, as would be known to those of ordinary skill in the art. Exemplary embodiments provide for engine fuel data to be supplied by an engine fuel map look-up table (LUT) 217, 420 containing engine fuel data obtained, for example, from engine performance measurements under various speed/torque and grade combinations versus fuel consumed. The engine fuel map LUT is calibrated offline and embodies the relationship between engine torque, engine speed, grade and engine fueling. Knowing the vehicle's power train system, such as the driveline ratio, gear ratio, driveline system losses, etc., engine speed and torque can be converted to vehicle speed and transmission gear at a certain grade. Thus, an engine fuel map LUT can be obtained from an engine friction map LUT. Alternatively, a vehicle speed and grade based map can be obtained by driving the given vehicle at fixed speeds on constant grades, such as provided either in a controlled facility like a chassis dyno test cell, or by simulating the grade on a flat grade road using a programmable tow-dyno trailer. Separate engine fuel data is available for conditions when engine braking is enabled or when engine braking is disabled. Thus, by knowing power demand, vehicle speed, and transmission gear, which when coupled with engine speed and torque, a particular point on the engine map can be identified.

A change in engine speed location on the engine map will require a change in engine torque to achieve the same output power. And for a given point on the engine map, a certain amount of fuel will be required. Thus, by changing the engine speed and torque point, the amount of fuel needed to provide the same output power varies. By recognizing or determining the desired location on the engine map that minimizes fuel for a given power requirement, an equivalent vehicle speed choice can be back-calculated. Accordingly, an assessment of fuel consumption can be realized by traversing the engine map to find the appropriate engine speed and torque combination to satisfy the power demand and fuel consumption.

Figure 4:
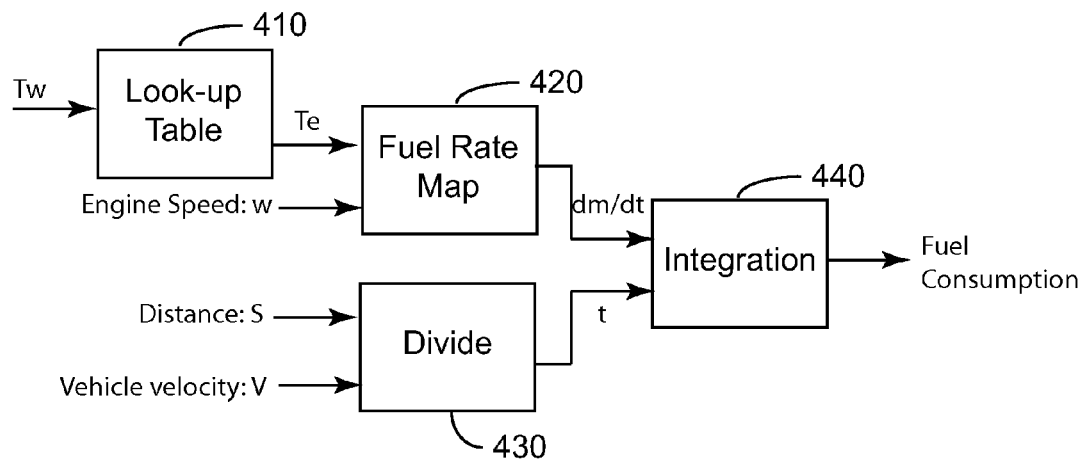
FIG. 4 is a flow diagram depicting an exemplary embodiment of a subsystem process of vehicle load distribution in accordance with an exemplary embodiment.

FIG. 4 is a flow diagram depicting an exemplary embodiment of a subsystem process of vehicle load distribution in accordance with an exemplary embodiment of the present disclosure. Torque on the vehicle's wheel is a function of force on the wheel and wheel radius, as expressed by $T_w = F_w \times R_w$, where force can be expressed by power, shown by Equation I, divided by vehicle velocity (v). With the torque on the vehicle's wheel known, a look-up table 410 can be accessed yielding torque loss in relation to gear ratio to provide engine torque ($T_e$). Engine torque ($T_e$) coupled with engine speed ($\omega$) can then be used to access an engine fuel map look-up table 420 to yield fuel flow rate $$\left(\frac{dm}{dt}\right).$$

Distance vectors (s) can be obtained from GPS unit 131, which when divided 430 by vehicle velocity (v) yields time (t) spent on that distance. Fuel rate $$\left(\frac{dm}{dt}\right)$$

can be integrated 440 through time (t) to determine fuel consumption over the distance. This analysis can be performed for all segments of the route to determine fuel needed to traverse the entire route for each vehicle. Exemplary embodiments provide for a fuel determination/assessment to be performed for each vehicle. Exemplary embodiments provide for one or more of the vehicles to have different points of origin and/or different destinations, thus having different routes. Once the amount of fuel anticipated to traverse the entire route for each vehicle is known, that is, the fuel quantity needed for each vehicle to undertake a given route, determination of a first set of freight distribution solutions can be made. This first set of solutions comprise the initial generation, where each solution in the set is determined under the constraints of maximum allowable freight weight for each of vehicle and the total freight weight.

A generation comprises a set (or population) of viable solutions of freight distribution amongst the set of vehicles being employed to transport the freight. A solution is viable when it adheres to the constraints of maximum allowable freight weight for each vehicle and the total freight weight. A generation can be expressed formulaically by $G_x = [P_1, P_2, \ldots P_m]$, where $G_x$ is the xth generation and where each $P_i$ is viable solution "i" to the freight distribution task, that is, the solution space comprising "m" possible solutions. A singular freight distribution solution can be expressed as $P_a$, where each vehicle within solution $P_a$ is loaded with a freight weight (W). This can be expressed formulaically by $P_a = [W_{veh\ 1}, W_{veh\ 2}, \ldots W_{veh\ n}]$, where each $W_{veh\ i}$ is the weight of freight being carried in vehicle i. That is, in solution $P_a$ Truck 1 carries $W_{veh\ 1}$ lbs, Truck 2 carries $W_{veh\ 2}$ lbs, continuing up to Truck n, which carries $W_{veh\ n}$ lbs. The initial generation ($G_0$) of viable solutions comprise a random distribution of freight amongst the plurality of vehicles within each solution $P_i$, that is, the freight is randomly distributed amongst each vehicle within each $P_i$, step 330. To determine the random distribution of weight, exemplary embodiments employ a weight function that randomly generates a freight weight that forces the solution space to meet the load limit constraints on maximum vehicle load and total freight weight. This can be expressed by Equation III:

$$W_{veh\ i} = \text{Random} \begin{bmatrix} \left[ W_{Total} - \sum_{j=1}^{i-1} W_{veh\ j} - \sum_{j=i+1}^{n} W_{veh\ j}^{Max} \right] \\ \Updownarrow \\ W_{veh\ i}^{Max} \end{bmatrix} \quad \text{Equation III}$$

Where $W_{Total}$ is the total freight to be distributed wherein the freight weight for the ith vehicle is randomly generated under the guide of subtracting the freight weight being carried by the i−1 and i+1 vehicles from the total, under the maximum vehicle load and total freight weight constraints After determining the initial generation ($G_0$), module 105 evaluates the fitness of each solution, step 340. Fitness is a function of fuel economy. Vehicle parameter data 110 for each vehicle, coupled with road terrain element data 120, is processed over a route simulation employing the engine fuel map and engine efficiencies for each vehicle to determine fuel consumption as discussed above. In so doing we arrive at an estimate of fuel economy for each solution within the generation and ranked from highest to lowest. Fitness of a solution $P_a$ can be expressed by $$H_a = \sum_{i=1}^{n} \frac{D_{cycle\ dist}}{F_{veh\ i}},$$

where $D_{cycle\ dist}$ is the cycle distance and $F_{veh\ i}$ is an integration of the instantaneous fueling over the cycle for all vehicles in $P_a$.

Exemplary embodiments determine subsequent freight distribution solutions, under constraints based on maximum vehicle freight weight for each vehicle and total freight weight according to a genetic algorithm, wherein the second plurality of freight distribution solutions comprising a next generation, and so on, step 350. Given a solution generation $G_x$, a genetic algorithm provides a subsequent solution generation $G_{x+1}$ by executing one or more processes of reproduction, crossover, and mutation. Reproduction involves reproducing the solution of a population $P_a$ according to probabilities allocated based on fitness. Each member $P_a$ of $G_x$ has an associated fitness value $H_a$, wherein each member $P_a$ of $G_{x+1}$ is generated probabilistically as a function of fitness value $H_a$. The first step in reproduction is to create a normalized probability vector, as shown by $$\frac{H_1}{\sum_{a=1}^{m} H_a}, \frac{H_2}{\sum_{a=1}^{m} H_a}, \ldots, \frac{H_m}{\sum_{a=1}^{m} H_a}.$$

A random number between 0 and 1 is then generated. $P_a$ is reproduced if $$\frac{\sum_{b=1}^{a'-1} H_b}{\sum_{a=1}^{m} H_a} < r \le \frac{\sum_{b=1}^{a'} H_b}{\sum_{a=1}^{m} H_a}.$$

These steps are repeated until solution generation $G_{x+1}$ is formed of m members (solutions) 235. The number of solutions m 235 is a subjective measure and is a function of the search space. The larger the search space, the larger the population size. Exemplary embodiments provide for the number of solutions 235 to be provided by the operator.

The next step in evolving a generation of viable solutions is to employ another feature of genetic algorithms, crossover. The basic idea in crossover is to take two viable solutions and exchange parts of each with the other to generate two new solutions. Exemplary embodiments define a crossover probability $\delta_{crossover}$ (for example, $\delta_{crossover}$=0.7) and select two solutions (for example, two successive solutions). Next a random number between 0 and 1 is generated. If the random number generated is less than the crossover probability, then a crossover exchange is executed. These steps are repeated until a new population of m members (solutions) is formed.

Figure 5:
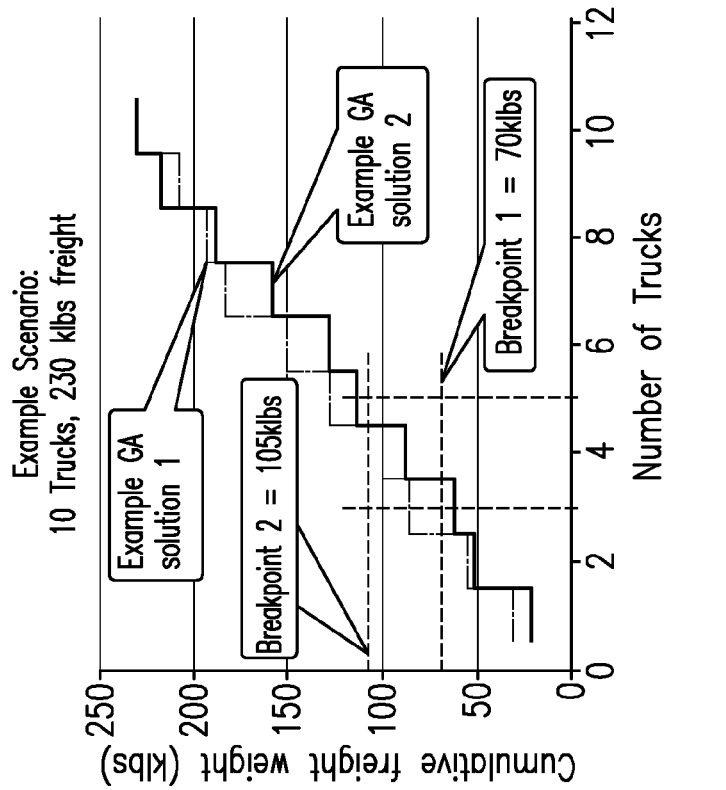
FIG. 5 is an example of crossover exchange, where breakpoints 1 and 2 are randomly selected.
Figure 6:
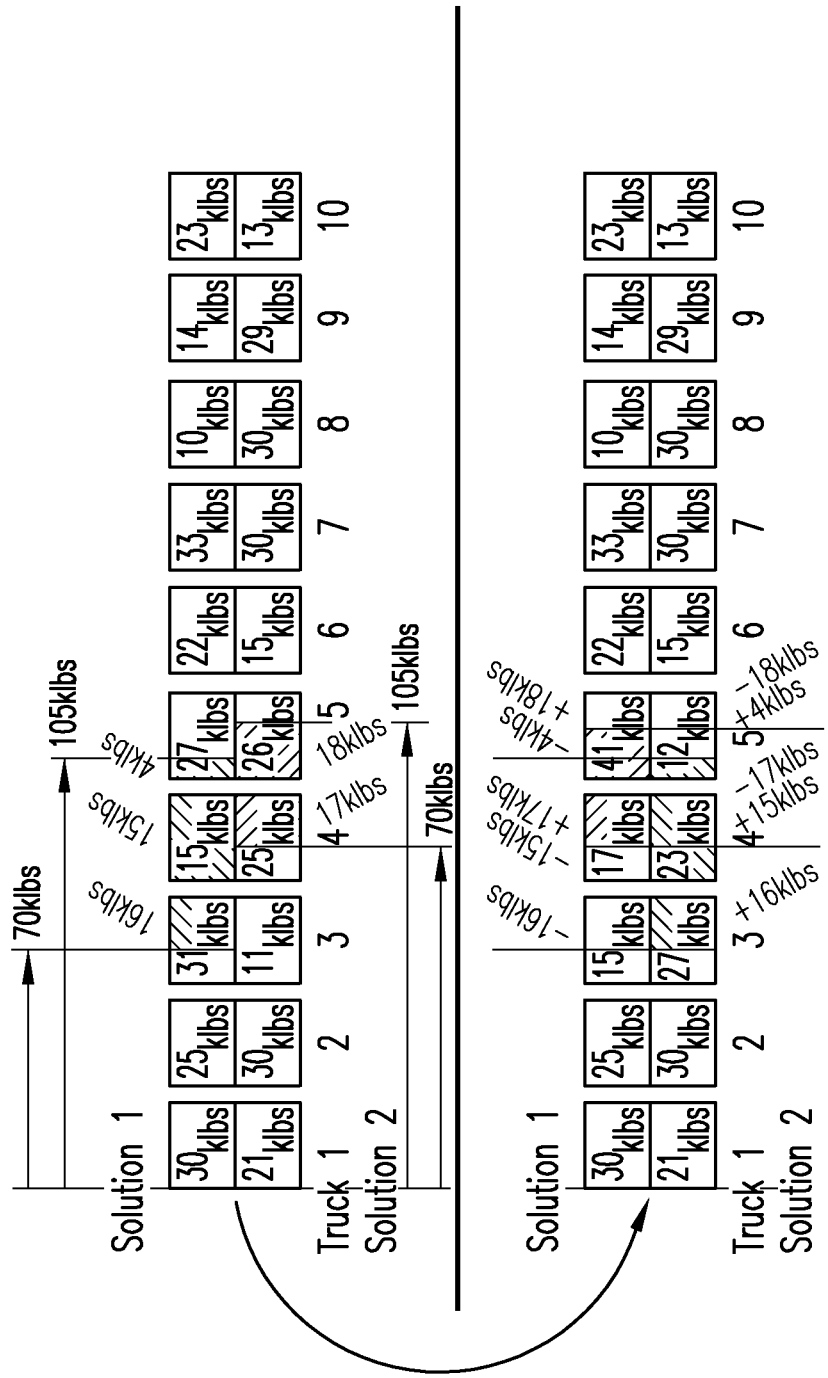
FIG. 6 is an example of crossover exchange, where breakpoints 1 and 2 are randomly selected.

An example of crossover exchange is provided by FIGS. 5 and 6, where breakpoints 1 and 2 are randomly selected.

After freight weight crossover is completed, a check against load limit constraints on maximum vehicle load and total freight weight is completed. If a weight allocated to a truck exceeds the weight limit, then the crossover is repeated.

The next step in evolving a generation of viable solutions is to employ another feature of genetic algorithms, mutation. Exemplary embodiments define for each member $P_a$ of $G_x$ a mutation probability $\delta_{mutation}$ (for example, δmutation=0.001). Next a random number between 0 and 1 is generated. If the random number generated is less than the mutation probability, then solution $P_a$ is to be mutated. Mutation involves a random selection of two vehicles in the solution P where at least one of the selected vehicles is filled to partial capacity. Then, freight is randomly selected and moved from the heavier vehicle to the lighter vehicle. These steps are repeated for each member of the population.

After the next generation of solutions has been formed, module 105 evaluates the fitness of each solution, step 360, employing a similar evaluation procedure described above, evaluating each of the freight distribution solutions of the next generation for fitness based on fuel economy, ranking each solution based on the evaluation. After fitness evaluation solution convergence based on the ranking is assessed, step 370. Convergence can occur if through successive iterations change to the solution population is below a threshold value, which in exemplary embodiments is provided by the operator as convergence threshold 236. If the solution population is below the threshold value 236, the optimal freight distribution is thus determined. Other embodiments terminate the process after a predetermined number of iterations have occurred. An electronic recommendation signal corresponding to the determined optimal freight distribution is generated and communicated to a receiver, step 390. In exemplary embodiments the receiver is a display, 107.

Exemplary embodiments provide a system adapted to determine freight distribution amongst multiple vehicles. The system includes an operator input module containing data indicative of at least one operator input, the at least one operator input including at least one of fuel cost, trip time, route beginning and ending points to define a route, and maximum vehicle speed. The system further includes a vehicle parameter module containing data indicative of at least one predetermined vehicle parameter, the at least one predetermined vehicle parameter including at least one of vehicle mass, vehicle drag, vehicle rolling resistance, tire circumference, front area of vehicle, powertrain torque loss, vehicle tank capacity, and engine efficiency. The system also includes a road terrain element module containing data indicative of at least one road terrain element, the at least one road terrain element including at least one of speed limit changes, road grade, air density, position, elevation, and traffic patterns. And the system includes a vehicle load distribution module adapted to determine a first and second plurality of freight distribution solutions based on the maximum vehicle freight weight for each of the vehicles and the total freight weight, each solution from the first plurality comprising a random distribution of freight amongst the plurality of vehicles, the first plurality of freight distribution solutions comprising an initial generation, each solution from the second plurality comprising a distribution of freight amongst the plurality of vehicles according to a genetic algorithm, the second plurality of freight distribution solutions comprising a next generation; evaluate each of the first and second freight distribution solutions for fitness based on fuel economy and ranking each solution based on the evaluation, the fitness module being further adapted to assess solution convergence based on the ranking and determine an optimal freight distribution based on the convergence assessment; and generate an electronic recommendation signal corresponding to the determined optimal freight distribution and communicate the recommendation signal to a receiver.

Exemplary embodiments provide a system and method for determining freight distribution amongst multiple vehicles to be implemented in computer programmable software and stored in computer readable media. Such an embodiment would comprise a computer readable storage medium encoded with computer executable instructions, which, when executed by a processor, perform the method for determining freight distribution amongst multiple vehicles as disclosed above. Also, many aspects of the disclosure are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions (software), such as program modules, being executed by one or more processors, or by a combination of both. Moreover, the disclosure can additionally be considered to be embodied within any form of computer readable carrier, such as solid-state memory, magnetic disk, and optical disk containing an appropriate set of computer instructions, such as program modules, and data structures that would cause a processor to carry out the techniques described herein. A computer-readable medium would include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (EPROM or Flash memory), or any other medium capable of storing information. It should be noted that the system of the present disclosure is illustrated and discussed herein as having various modules and units which perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Thus, the various aspects of the disclosure may be embodied in many different forms, and all such forms are contemplated to be within the scope of the disclosure.

While various embodiments in accordance with the present disclosure have been shown and described, it is understood that the disclosure is not limited thereto. Further, the present disclosure may be changed, modified and further applied by those skilled in the art. Therefore, this disclosure is not limited to the detail shown and described previously, but also includes all such changes and modifications.

We claim:

1. A method for determining freight distribution amongst multiple vehicles, comprising:
   accessing, by a processor, operator input data indicative of at least one operator input, said at least one operator input including at least one of route beginning and ending points to define a route, number of vehicles, maximum vehicle freight weight for each of a plurality of vehicles, and total freight weight;
   accessing, by the processor, predetermined vehicle parameter data for each of said plurality of vehicles indicative of at least one predetermined vehicle parameter, said at least one predetermined vehicle parameter including at least one of vehicle mass, vehicle drag, vehicle rolling resistance, tire circumference, front area of vehicle, powertrain torque loss, vehicle tank capacity, and engine efficiency;
   accessing, by the processor, road terrain data indicative of at least one road terrain element, said at least one road terrain element including at least one of speed limit changes, road grade, air density, position, elevation, and traffic patterns;
   determining, by the processor, a first plurality of freight distribution solutions based on said maximum vehicle freight weight for each of said vehicles and said total freight weight, each solution comprising a random distribution of freight amongst the plurality of vehicles, the first plurality of freight distribution solutions comprising an initial generation;
   evaluating, by the processor, each of said first plurality of freight distribution solutions of the initial generation for fitness based on fuel economy and ranking each solution based on the evaluation;
   determining, by the processor, a second plurality of freight distribution solutions based on said maximum vehicle freight weight for each of said vehicles and said total freight weight, each solution comprising a distribution of freight amongst the plurality of vehicles according to a genetic algorithm structured to selectively execute a reproduction process first, a crossover process second, and a mutation process third, wherein the second plurality of freight distribution solutions includes a next generation;
   generating, by the processor, a first random number associated with the crossover process and a second random number associated with the mutation process;
   executing, by the processor, the crossover process responsive to the first random number being less than a crossover probability;
   executing, by the processor, the mutation process responsive to the second random number being less than a mutation probability;
   evaluating, by the processor, each of said freight distribution solutions of the next generation for fitness based on fuel economy, ranking each solution based on the evaluation, and assessing solution convergence based on the ranking;
   determining, by the processor, an optimal freight distribution based on said convergence assessment; and
   generating, by the processor, an electronic recommendation signal corresponding to said determined optimal freight distribution and communicating said recommendation signal to a receiver.

2. The method of claim 1, wherein said receiver comprises a display adapted to indicate the optimal freight distribution to an operator and indicate a measure of freight efficiency improvement.

3. The method of claim 2, wherein said display comprises a touch-screen interface.

4. The method of claim 1, wherein said solution convergence is assessed based on a fitness threshold.

5. The method of claim 1, wherein each of said crossover probability and mutation probability comprises a plurality of probabilities associated with each of the crossover and mutation processes respectively, said probabilities being adjusted based on said convergence assessment.

6. The method of claim 1, wherein said at least one operator input further includes a number representing a predetermined quantity of freight distribution solutions.

7. The method of claim 1, further comprising determining route grade and speed profile vectors for the defined route based on said operator input data, said predetermined vehicle parameter data, and said road terrain data.

8. The method of claim 1, wherein evaluating for fitness is based on an evaluation of engine speed and torque values yielding said engine fueling demand for a given vehicle power, said power being based on route grade and speed profile vectors for the defined route, said route grade and speed vectors being based on said operator input data, said predetermined vehicle parameter data, and said road terrain data.

9. The method of claim 8, wherein a plurality of said engine speed and torque values can collectively form an engine fuel map, said map being employed to establish an engine fueling table.

10. A system adapted to determine freight distribution amongst multiple vehicles, comprising:
    an operator input module containing data indicative of at least one operator input, said at least one operator input including at least one of fuel cost, trip time, route beginning and ending points to define a route, and maximum vehicle speed;
    a vehicle parameter module containing data indicative of at least one predetermined vehicle parameter, said at least one predetermined vehicle parameter including at least one of vehicle mass, vehicle drag, vehicle rolling resistance, tire circumference, front area of vehicle, powertrain torque loss, vehicle tank capacity, and engine efficiency;

a road terrain element module containing data indicative of at least one road terrain element, said at least one road terrain element including at least one of speed limit changes, road grade, air density, position, elevation, and traffic patterns; and a vehicle load distribution module adapted to:

determine a first and second plurality of freight distribution solutions based on said maximum vehicle freight weight for each of said vehicles and said total freight weight, each solution from said first plurality comprising a random distribution of freight amongst the plurality of vehicles, the first plurality of freight distribution solutions comprising an initial generation, each solution from said second plurality comprising a distribution of freight amongst the plurality of vehicles according to a genetic algorithm structured to selectively execute a reproduction process first, a crossover process second, and a mutation process third, the second plurality of freight distribution solutions comprising a next generation;

generate a first random number associated with the crossover process and a second random number associated with the mutation process;

execute the crossover process responsive to the first random number being less than a crossover probability;

execute the mutation process responsive to the second random number being less than a mutation probability;

evaluate each of said first and second freight distribution solutions for fitness based on fuel economy and ranking each solution based on the evaluation, said fitness module being further adapted to assess solution convergence based on said ranking and determine an optimal freight distribution based on said convergence assessment; and generate an electronic recommendation signal corresponding to said determined optimal freight distribution and communicate said recommendation signal to a receiver.

11. The system of claim 10, wherein said receiver comprises a display adapted to indicate the optimal freight distribution to an operator and indicate a measure of freight efficiency improvement.

12. The system of claim 11, wherein said display comprises a touch-screen interface.

13. The system of claim 10, wherein said fitness evaluation is based on an evaluation of engine speed and torque values yielding said engine fueling demand for a given vehicle power, said power being based on route grade and speed profile vectors for the defined route, said route grade and speed vectors being based on said operator input data, said predetermined vehicle parameter data, and said road terrain data.

14. The system of claim 13, wherein a plurality of said engine speed and torque values can collectively form an engine fuel map, said map being employed to establish an engine fueling table.

15. The system of claim 10, wherein said solution convergence is assessed based on a fitness threshold.

16. The system of claim 10, wherein each of said crossover probability and mutation probability comprises a plurality of probabilities associated with each of the crossover and mutation processes respectively, said probabilities being adjusted based on said convergence assessment.

17. The system of claim 10, wherein said vehicle load distribution module is further adapted to determine route grade and speed profile vectors for the defined route based on said operator input data, said predetermined vehicle parameter data, and said road terrain data.

18. A tangible, non-transitory computer program product comprising a computer useable medium having stored thereon computer-readable instructions for determining freight distribution amongst multiple vehicles, the computer-readable instructions being executable by a processor to perform operations comprising:

accessing data indicative of at least one operator input, said at least one operator input including at least one of route beginning and ending points to define a route, number of vehicles, maximum vehicle freight weight for each of a plurality of vehicles, and total freight weight;

accessing data indicative of at least one predetermined vehicle parameter, said at least one predetermined vehicle parameter including at least one of vehicle mass, vehicle drag, vehicle rolling resistance, tire circumference, front area of vehicle, powertrain torque loss, vehicle tank capacity, and engine efficiency;

accessing data indicative of at least one road terrain element, said at least one road terrain element including at least one of speed limit changes, road grade, air density, position, elevation, and traffic patterns;

determining a first plurality of freight distribution solutions based on said maximum vehicle freight weight for each of said vehicles and said total freight weight, each solution comprising a random distribution of freight amongst the plurality of vehicles, the first plurality of freight distribution solutions comprising an initial generation;

evaluating each of said first plurality of freight distribution solutions of the initial generation for fitness based on fuel economy and ranking each solution based on the evaluation;

determining a second plurality of freight distribution solutions based on said maximum vehicle freight weight for each of said vehicles and said total freight weight, each solution comprising a distribution of freight amongst the plurality of vehicles according to a genetic algorithm structured to selectively execute a reproduction process first, a crossover process second, and a mutation process third, the second plurality of freight distribution solutions comprising a next generation;

generating a first random number associated with the crossover process and a second random number associated with the mutation process;

executing the crossover process responsive to the first random number being less than a crossover probability;

executing the mutation process responsive to the second random number being less than a mutation probability;

evaluating each of said freight distribution solutions of the next generation for fitness based on fuel economy, ranking each solution based on the evaluation, and assessing solution convergence based on the ranking;

determining an optimal freight distribution based on said convergence assessment; and communicating said optimal freight distribution to a display.

* * * * *